(12) United States Patent
Ueta et al.

(10) Patent No.: US 10,287,961 B2
(45) Date of Patent: May 14, 2019

(54) CONSTRUCTION MACHINE INCLUDING EXHAUST-GAS AFTER-TREATMENT DEVICE

(71) Applicant: KOBELCO CONSTRUCTION MACHINERY CO., LTD., Hiroshima-shi (JP)

(72) Inventors: Toshiro Ueta, Hiroshima (JP); Tatsuya Shiraishi, Hiroshima (JP); Mari Sasaki, Hiroshima (JP); Takashi Tazoe, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 95 days.

(21) Appl. No.: 15/489,870

(22) Filed: Apr. 18, 2017

(65) Prior Publication Data
US 2017/0314449 A1 Nov. 2, 2017

(30) Foreign Application Priority Data
Apr. 28, 2016 (JP) ................. 2016-090507

(51) Int. Cl.
*B60K 13/04* (2006.01)
*B60K 5/12* (2006.01)
(Continued)

(52) U.S. Cl.
CPC ............ *F01N 13/1805* (2013.01); *B60K 5/12* (2013.01); *B60K 5/1208* (2013.01); *B60K 13/04* (2013.01);
(Continued)

(58) Field of Classification Search
CPC ........ B60K 13/04; B60K 5/12; B60K 5/1208; E02F 9/0808; E02F 9/0866; F01N 13/1805; F01N 3/08; F01N 2590/08; F01N 3/021; F01N 3/2066; F02B 63/06; B60Y 2200/41; B60Y 2200/412
See application file for complete search history.

(56) References Cited

U.S. PATENT DOCUMENTS

2010/0031644 A1 2/2010 Keane et al.
2010/0126791 A1 5/2010 Okada
(Continued)

FOREIGN PATENT DOCUMENTS

JP 2001-271375 A 10/2001
JP 2007-331602 12/2007
(Continued)

OTHER PUBLICATIONS

Machine Translation of JP 2012215022 A (Kozo).*
(Continued)

*Primary Examiner* — Brandon D Lee
(74) *Attorney, Agent, or Firm* — Oblon, McClelland, Maier & Neustadt, L.L.P.

(57) ABSTRACT

Provided is a construction machine including an exhaust-gas after-treatment device and capable of supporting the exhaust-gas after-treatment device in a limited space. The construction machine includes an upper frame, an engine mounted on the upper frame via a plurality of engine mounts, a hydraulic pump coupled to the engine, the exhaust-gas after-treatment device, and a support cradle supporting the exhaust-gas after-treatment device over the hydraulic pump. The upper frame includes a plurality of mount support portions and a leg support portion. The support cradle includes a support stage on which the exhaust-gas after-treatment device is mounted, and a plurality of legs. The plurality of mount support portions include a space-defining mount support portion defining a horizontal space against the hydraulic pump. The plurality of legs include an in-space leg extending in the space. The leg support portion is located to overlap the space in a plan view.

3 Claims, 4 Drawing Sheets

(51) Int. Cl.
*E02F 9/08* (2006.01)
*F01N 13/18* (2010.01)
*F01N 3/08* (2006.01)
*F02B 63/06* (2006.01)
*F01N 3/20* (2006.01)
*F01N 3/021* (2006.01)

(52) U.S. Cl.
CPC .......... *E02F 9/0808* (2013.01); *E02F 9/0866* (2013.01); *F01N 3/08* (2013.01); *F02B 63/06* (2013.01); *B60Y 2200/41* (2013.01); *B60Y 2200/412* (2013.01); *F01N 3/021* (2013.01); *F01N 3/2066* (2013.01); *F01N 2590/08* (2013.01); *Y02A 50/2325* (2018.01)

(56) References Cited

U.S. PATENT DOCUMENTS

| | | | |
|---|---|---|---|
| 2012/0247861 A1 | 10/2012 | Mizuno et al. | |
| 2012/0273648 A1 | 11/2012 | Maske et al. | |
| 2016/0215477 A1 | 7/2016 | Kumagai et al. | |

FOREIGN PATENT DOCUMENTS

| | | | |
|---|---|---|---|
| JP | 2010-127094 A | | 6/2010 |
| JP | 2012-215022 | | 11/2012 |
| JP | 2012-219625 A | | 11/2012 |
| JP | 2012215022 A | * | 11/2012 |
| JP | 2014-240647 A | | 12/2014 |
| JP | 2015-86573 | | 5/2015 |
| JP | 2015-140641 A | | 8/2015 |
| WO | WO 2015/115181 A1 | | 8/2015 |

OTHER PUBLICATIONS

Extended Search Report dated Sep. 18, 2017 in European Patent Application No. 17167322.1.
Office Action dated Apr. 3, 2018 in corresponding Japanese Patent Application No. 2016-090507 (with English Translation), citing documents AA, AB, AO, AP, AQ, AR and AS therein, 5 pages.

* cited by examiner

CONSTRUCTION MACHINE INCLUDING EXHAUST-GAS AFTER-TREATMENT DEVICE

TECHNICAL FIELD

The present invention relates to a construction machine including an exhaust-gas after-treatment device.

BACKGROUND ART

There is known a conventional construction machine including a lower travelling body and an upper slewing body slewably mounted on the lower travelling body, the upper slewing body having a slewing frame which bears an engine, a hydraulic pump, and an exhaust-gas after-treatment device. For example, Japanese Unexamined Patent Publication No. 2015-86573 discloses a construction machine including an after-treatment-device support cradle to support an exhaust-gas after-treatment device thereon while covering the hydraulic pump on the upper side thereof, the after-treatment device support cradle having a front leg, a rear leg, an auxiliary leg, and an after-treatment-device supporting. Each of the front leg and the rear leg of the after-treatment device support cradle has a bottom base extending in the lateral direction corresponding to the width of the after-treatment-device support cradle. The bottom base allows the after-treatment-device support cradle to support the exhaust-gas after-treatment device with respective substantially enlarged areas in which each of the front and rear legs is placed on the slewing frame.

However, in a certain size of construction machine, it is not easy to assure a space for disposing the after-treatment-device support cradle. For example, a large-sized construction machine provided with a center section and side decks provided on the opposite sides of the center section, thus having a large space in the periphery of an engine and a hydraulic pump, allows an after-treatment-device support cradle to be mounted on a slewing frame thereof even if the cradle includes a front leg or a rear leg with respective bottom bases each laterally extending. In contrast, for example, a construction machine including an upper slewing body whose rear portion rotates in a small range having a small slewing radius falling within a width of the lower traveling body, namely, a so-called tight quarter type of construction machine, has only a limited space in the periphery of the engine or the hydraulic pump, not allowing the above after-treatment-device support cradle having the above-described bottom bases each laterally extending to be directly mounted on a slewing frame thereof.

SUMMARY OF INVENTION

An object of the present invention is to provide a construction machine including an exhaust-gas after-treatment device and capable of supporting the exhaust-gas after-treatment device in a limited space. Provided is a construction machine including: an upper frame; an engine mounted on the upper frame via a plurality of engine mounts; a hydraulic pump coupled to the engine; an exhaust-gas after-treatment device carried by the upper frame; and a support cradle supporting the exhaust-gas after-treatment device at a position over the hydraulic pump. The upper frame includes a plurality of mount support portions to which the plurality of engine mounts are fixed, respectively, and a leg support portion. The support cradle has a support stage on which the exhaust-gas after-treatment device is placed and a plurality of legs each extending downward from the support stage. The plurality of legs include an in-space leg having a foot as a bottom end thereof and disposed in a space defined between a specific mount support portion among the plurality of mount support portions and the hydraulic pump. The leg support portion is located so as to overlap the space in a plan view to allow the in-space leg to extend vertically in the space while the foot of the in-space leg is fixed to the leg support portion.

These and other objects, features and advantages of the present invention will become more apparent upon reading the following detailed description along with the accompanying drawings.

DESCRIPTION OF EMBODIMENTS

There will be described below an embodiment of the present invention with reference to the accompanying drawings. It should be noted that the following description of the embodiment substantially shows only a preferable example of the present invention, and does not intend to delimit the present invention and an applicable or usable range of the present invention. In respective drawings, an upward and downward direction, a front and rear direction, and a right and left direction are indicated by arrows. Upward and downward, and other directions to be described below respectively correspond to the aforementioned directions indicated by the arrows but some exceptions.

Figure 1:
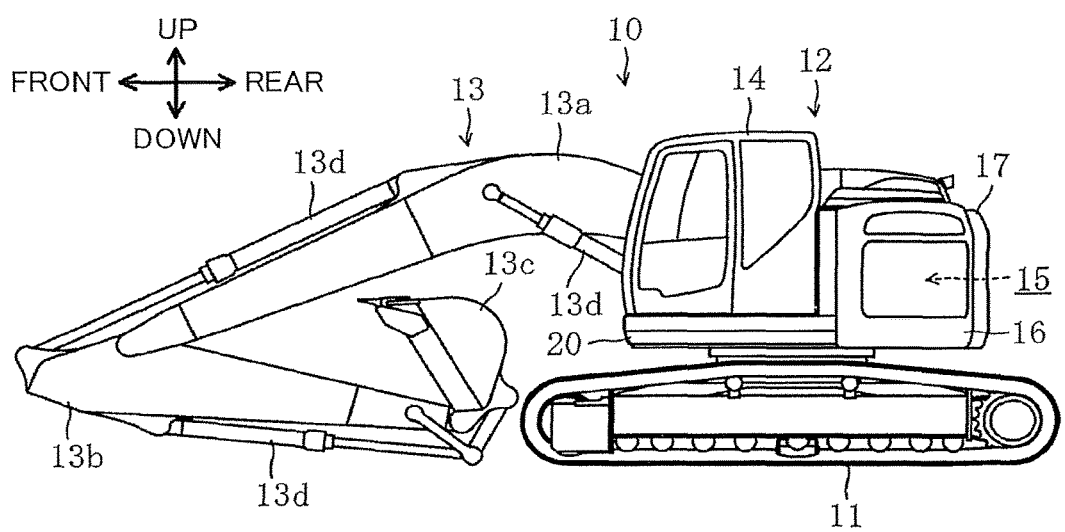
FIG. 1 is a side view of a construction machine according to an embodiment of the present invention.

FIG. 1 shows a construction machine 10 according to the embodiment. The construction machine 10 includes a lower travelling body 11 of the crawler type and an upper slewing body 12 slewably mounted on the lower travelling body 11. The upper slewing body 12 has an upper frame 20 serving as a machine-body frame, on which an attachment 13, a cab 14, and a machine chamber 15 are installed. The construction machine 10 according to the embodiment is a so-called tight quarter type of construction machine, which includes a rear portion having a slewing radius equal to or less than a half of the width of the lower traveling body 11. The upper slewing body 12 has a relatively small size so as to possess the small rotation radius, including an arc-shaped rear end with a radius corresponding to the slewing radius in a plan view.

The attachment 13, which is disposed on a front portion of the upper slewing body 12, includes a plurality of primary elements, namely, a boom 13a, an arm 13b and a bucket 13c, and a plurality of hydraulic cylinders 13d to actuate respective primary elements. Specifically, the primary elements are actuated through respective extensions or contractions of the hydraulic cylinders 13d under hydraulic control to perform an excavation operation and the like.

Respective manipulations for the primary elements are performed in the cab 14. The cab 14 is, for example, a substantially rectangular parallelepiped operator compartment, provided in a left part of the front portion of the upper slewing body 12 so as to be adjacent to the attachment 13.

The contraction machine 10 further includes an engine 30 and a hydraulic pump 32, which are densely packed within the machine chamber 15 together with other elements as described later (see FIG. 3).

The machine chamber 15 is defined in the rear portion of the upper slewing body 12. The machine chamber 15 is enclosed by a machine chamber cover 16 and a counterweight 17. The counterweight 17 is mounted on the rear portion of the upper slewing body 12 to keep a longitudinal weight balance against the attachment 13. The counterweight 17 has a rear end surface portion so curved as to form the above arc-shaped line of the rear end of the upper slewing body 12, covering the machine chamber 15 in a region from the rear end to respective opposite lateral sides of the construction machine. The machine chamber cover 16 also defines the machine chamber 15 in combination with the counterweight 17 so as to cover the engine 30 and other elements.

Figure 2:
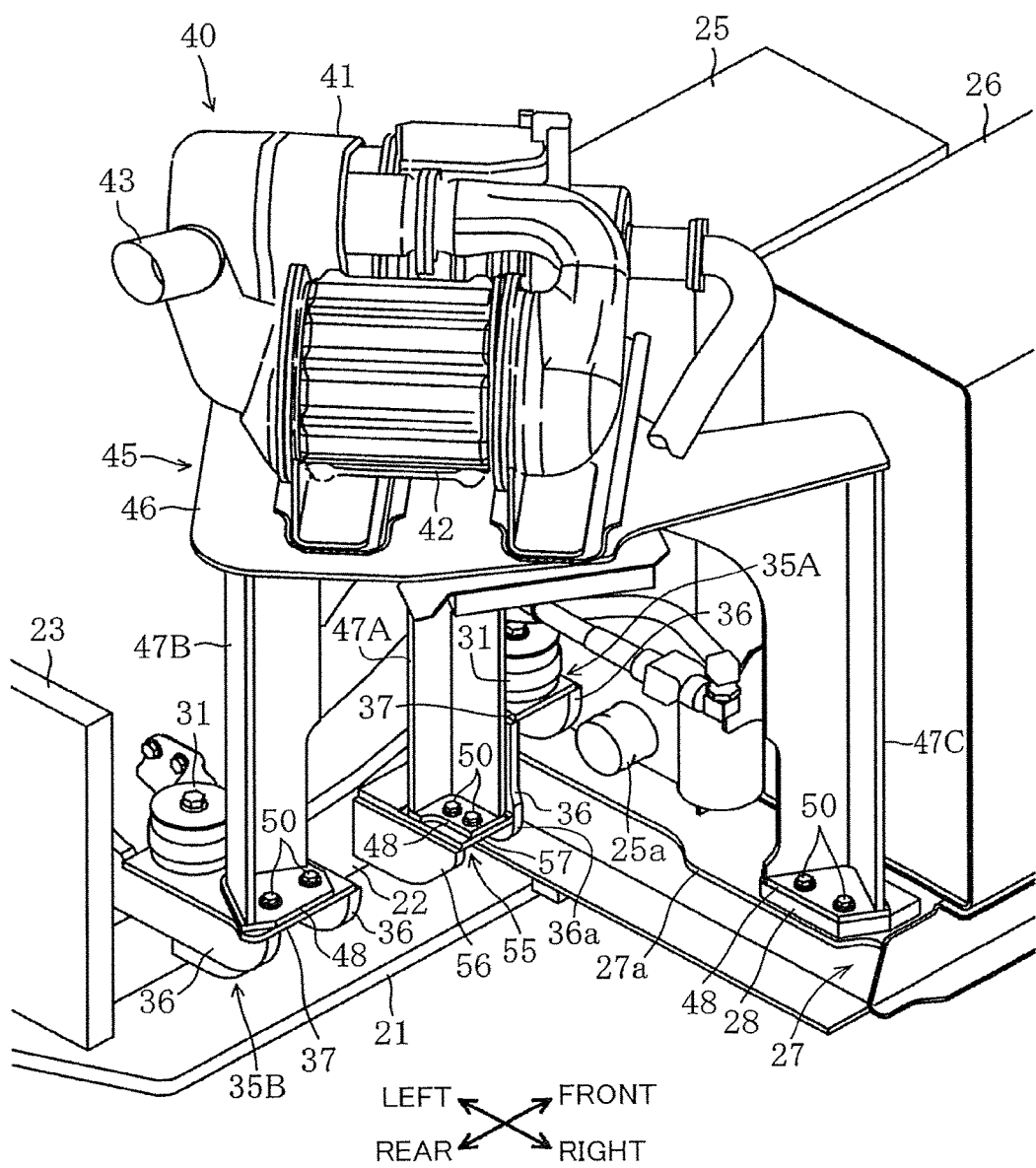
FIG. 2 is a perspective view showing an exhaust-gas after-treatment device and a support cradle that supports the same in the construction machine.
Figure 3:
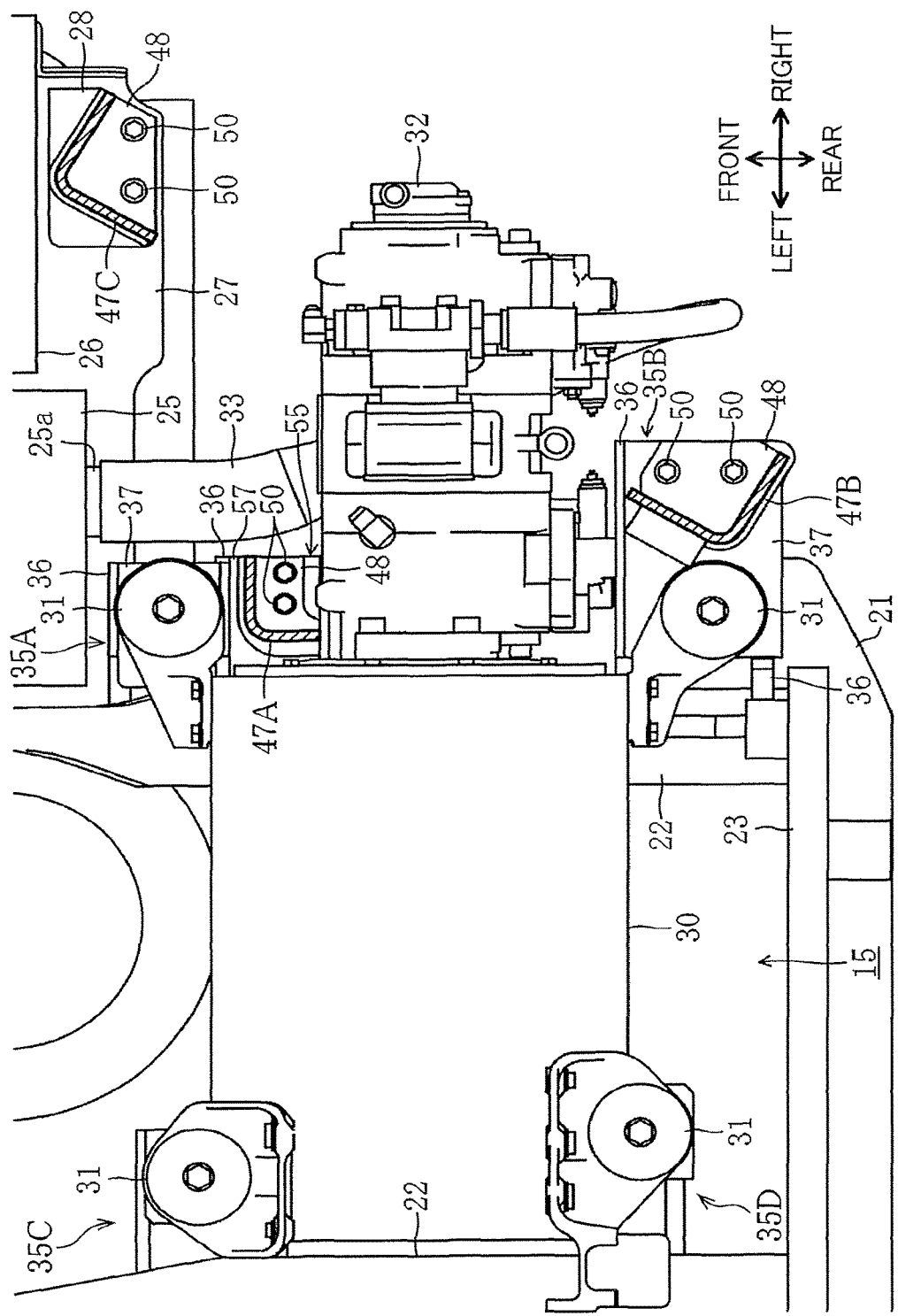
FIG. 3 is a plan view showing an arrangement of a plurality of legs of the support cradle, a part of the arrangement being shown in a section taken below the support stage.
Figure 4:
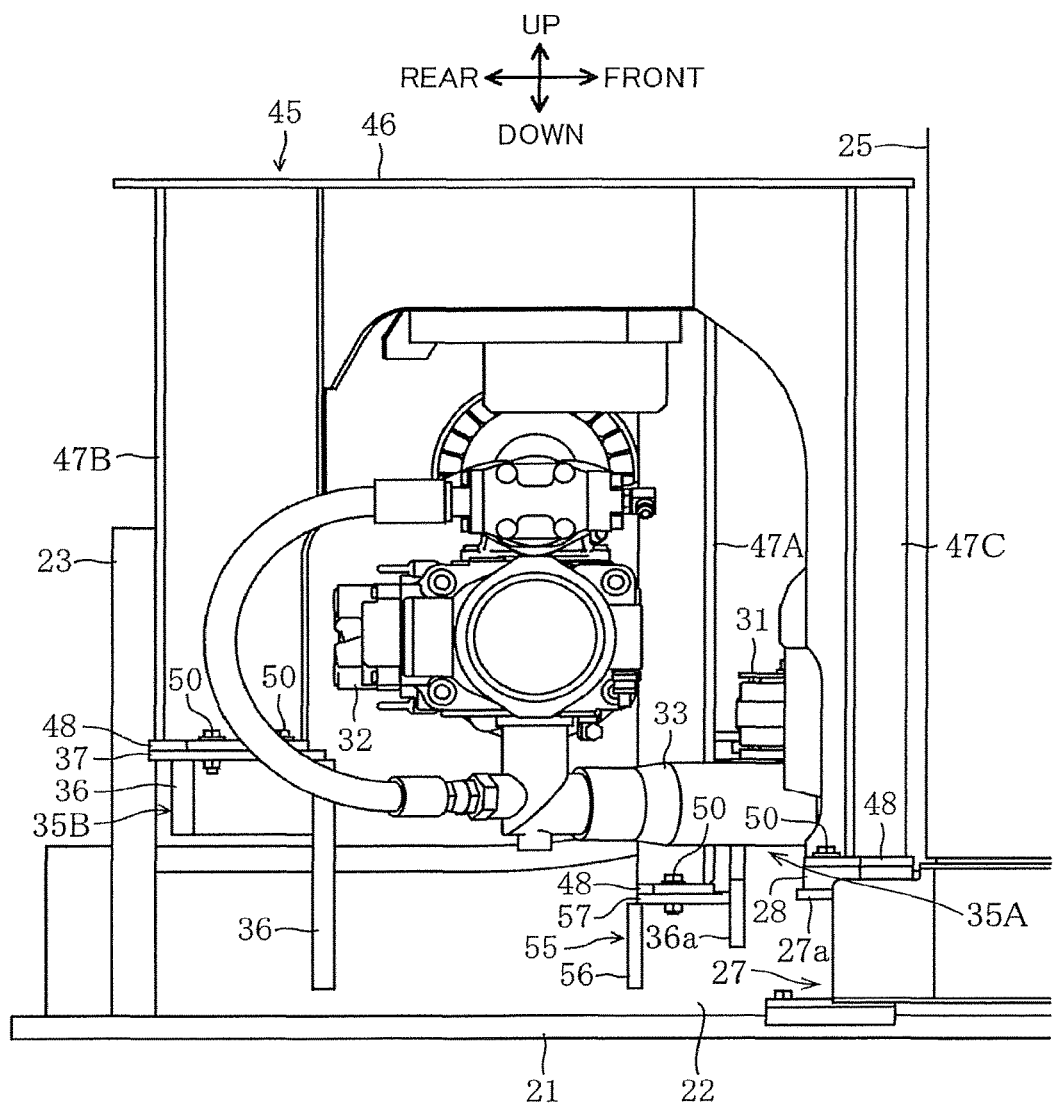
FIG. 4 is a side view showing the support cradle and elements lying in the periphery of the support cradle.

As shown in FIGS. 2 to 4, the upper frame 20 includes a base plate 21, a pair of longitudinal plates 22, and a lateral beam 23. Each of the pair of longitudinal plates 22 extends longitudinally, i.e., in the front and rear direction, while standing upright on the base plate 21. The pair of longitudinal plates 22 are spaced laterally, i.e., in the right and left direction. The widthwise beam 23 interconnects respective rear ends of the pair of longitudinal plates 22.

The upper frame 20 further includes a tank stage 27. The tank stage 27 is disposed on the base plate 21. The tank stage 27 has a support plate 27a on which a hydraulic fluid tank 25 and a fuel tank 26 are placed and arranged side by side in the right and left direction. The hydraulic fluid tank 25 has a connection port 25a. The connection port 25a is disposed in a lower part of a rear surface of the hydraulic fluid tank 25 to allow a below-described intake tube 33 to be connected to the connection port 25a. The support plate 27a of the tank stage 27 has a portion lying off the hydraulic fluid tank 25 and the fuel tank 26 rearward thereof to allow a pedestal board 28 to be joined to the lying-off portion.

The construction machine 10 also includes an exhaust-gas after-treatment device 40 for treating exhaust-gas from the engine 10. The exhaust-gas after-treatment device 40 is accommodated in the machine chamber 15 together with the engine 30 and the hydraulic pump 32. The hydraulic pump 32 is coupled to a right end of the engine 30. The exhaust-gas after-treatment device 40 is disposed over the hydraulic pump 32.

The upper frame 20 includes a plurality of mount support portions, namely, a mount support portion 35A, a mount support portion 35B, a mount support portion 35C and a mount support portion 35D, to which a plurality of engine mounts 31 are fixed, respectively. The engine 30 has a drive axis, being supported on the upper frame via the plurality of engine mounts 31 in such an attitude that the drive axis extends in the right and left direction. As shown in FIG. 3, the mount support portions 35A and 35B are placed in the front and rear direction, each protruding rightward beyond the right longitudinal plates 22, while the mount support portions 35C and 35D protruding rightward beyond the left the longitudinal plates 22.

Each of the plurality of mount support portions 35A to 35D has a pair of vertical mount support plates 36 spaced in the front and rear direction and a mount seat plate 37 disposed across the pair of mount seat plates 36 and joined thereto. One of the engine mounts 31 is fixed on the top surface of the mount seat plate 37.

The hydraulic pump 32 is connected to a hydraulic circuit for hydraulic control. The hydraulic pump 32 is driven by the engine 30 to increase the pressure of hydraulic fluid and supplied the hydraulic fluid. The hydraulic pump 32 sucks the hydraulic fluid from the hydraulic fluid tank 25 through the intake tube 33 connected to the connection port 25a of the hydraulic fluid tank 25. The intake tube 33 extends rearward from the connection port 25a to be connected to the hydraulic pump 32.

The exhaust-gas after-treatment device 40 includes a DPF (Diesel Particulate Filter) 41, an SCR (Selective Catalytic Reduction) system 42, and a not-graphically-shown injector, which are arrayed in a row on an exhaust passage extending from the engine 30 to an exhaust-gas cylinder 43. The DPF 41 and the SCR system 42 are arranged side by side in the right and left direction and disposed at a position over the hydraulic pump 32.

The DPF 41 is configured to catch and collect substance particles contained in the exhaust-gas, having a cylindrical casing and an oxidation catalyst accommodated in the cylindrical casing. The substance particles having been caught and collected in the DPF 41 are brought into self-combustion by the exhaust-gas having a high temperature. The DPF is thereby regenerated.

The injector injects a reductant liquid containing urea into the exhaust-gas having passed through the DPF 41. The urea liquid is thermally decomposed into an ammonia component by the exhaust-gas having the high temperature. The ammonia component is supplied, together with the exhaust-gas, to the downstream SCR system 42.

The SCR system 42 is configured to reduce nitrogen oxides contained in the exhaust-gas for purification by use of the ammonia component as a reductant, having a cylindrical casing and ammonia reducing catalyst accommodated in the cylindrical casing. The ammonia reducing catalyst expedites detoxification by oxidation of the ammonia component. The exhaust-gas thus purified in the SCR system 42 is discharged to the outside through the exhaust cylinder 43.

The construction machine 10 further includes a support cradle 45 supporting the exhaust-gas after-treatment device 40 at a position over the hydraulic pump 32. The support cradle 45 has a support stage 46, on which the DPF 41 and the SCR system 42 are placed, and a plurality of legs each extending downward from the support stage 46. The support cradle 45 according to the embodiment has three legs 47A, 47B and 47C extending from a front left end, a rear left end, and a front right end of the support stage 46, respectively.

Each of the legs 47A to 47C has a foot as a bottom end thereof, the foot being formed of a bottom plate 48 to be fixed to the upper frame 20. The bottom plate 48 of the leg 47C joined to the front right end of the support stage 46 is placed on the pedestal board 28 which is joined to the support plate 27a of the tank stage 27 and fastened to the pedestal board 28 through bolts 50. The bottom plate 48 of the leg 47B joined to the rear left end is placed on the mount support portion 35B on the rear right side and fastened thereto through another bolts 50.

The leg 47A joined to the front left end of the support stage 46 corresponds to an in-space leg as described later in detail, and the leg 47B corresponds to a counter leg located on the opposite side to the leg 47A across the hydraulic pump 32. The upper frame 20 includes a leg support portion 55 for the leg 47A as the in-space leg, the bottom plate 48 of the leg 47A being fixed to the leg support portion 55. The leg support portion 55 includes a leg support plate 56 and a cradle seat plate 57.

The mount support portion 35A serves as a space-defining mount support portion, which defines a horizontal space (in the front and rear direction according to the embodiment) between the mount support portion 35A and the hydraulic pump 32. The mount support portion 35B serves as a counter mount support portion, which is located on the opposite side to the mount support portion 35A across the hydraulic pump 32.

One of the pair of the mount support plates 36 constituting the mount support portion 35A (on the rear side in FIG. 2) is a pump-side mount support plate located closer to the hydraulic pump 32 than the other of the pair of the mount support plates 36, the pump-side mount support plate extending downward beyond the bottom plate 48 of the leg 47A. The leg support plate 56 is spaced horizontally (i.e., the front and rear direction in the embodiment) rearward from the foot 36a of the thus extending pump-side mount support plate 36. The cradle seat plate 57 is joined to the mount support plate 36 as the pump-side mount support plate and the leg support plate 56 so as to bridge them. The mount support plate 36 having the foot 36a, thus, also serves as a constituent element of the leg support portion 55.

As shown in FIG. 3, the leg support portion 55 is located so as to overlap the space defined between the hydraulic pump 32 and the mount support portion 35A, namely, the space-defining mount support portion, in a plan view, thus being visible through the space in a downward view from the top of the construction machine. The leg 47A is disposed so as to extend vertically in the space, and the bottom plate 48 thereof is placed on the cradle seat plate 57 and fastened thereto through bolts 50.

Although being a tight quarter type, the construction machine 10 allows the leg 47A, i.e., the in-space leg, to be disposed by utilization of the narrow space defined between the mount support portion 35A and the hydraulic pump 32, thereby allowing the support cradle 45 including the leg 47A to support the exhaust-gas after-treatment device 40.

The leg support portion 55, located so as to be visible through the space defined between the mount support portion 35A and the hydraulic pump 32 in the downward view from the top of the construction machine, enables the bottom plate 48 of the leg 47A to be placed on the leg support portion 55 by only an operation of lowering down the assembly of the exhaust-gas treatment device 40 and the support cradle 45 from a position just above the upper frame 12, by a crane or the like. The operation for mounting the exhaust-gas-after-treatment device 40 and the support cradle 45 on the upper frame 20 is thus facilitated.

In a side view as shown in FIG. 4, the leg support portion 55 supports the bottom plate 48 as the foot of the leg 47A of the support cradle 45 at a lower position than a position where the intake tube 33 is disposed. This disposition allows an operator to operate the bolts 50 for fastening the leg 47A to the leg support portion 55 on one lateral side of the construction machine under the condition where the bottom plate 48 of the leg 47A is placed on the leg support portion 55. This facilitates an assembling operation in a mass-production line and/or a mounting and dismounting operation in an operation site owing to the configuration.

The mount support plate 36 having the foot 36a, i.e., the pump-side mount support plate, serves as both the constituent element of the mount support portion 35A, i.e., the spacing mount support portion, located on the front right side, and the constituent element of the leg support portion 55. This allows the exhaust-gas after-treatment device 40 to be positioned relatively to the engine 30 with high accuracy.

Furthermore, in the embodiment, the leg 47B on the rear left side, i.e., the leg located on the opposite side to the leg 47A across the hydraulic pump 32, is fixed to the mount support portion 35B located on the rear right side, i.e., the counter mount support portion located on the opposite side to the mount support portion 35A across the hydraulic pump 32. Thus placing the engine mount 31 of the engine 30 and the support cradle 45 for the exhaust-gas after-treatment device 40 on the same member and fixing thereto enables the effect of positioning the exhaust-gas after-treatment device 40 relatively to the engine 30 with high accuracy to be more remarkable.

The present invention, however, should not be limited to the above-described embodiment. For example, the upper frame 20 may include an individual leg support portion dedicated to the leg 47B on the rear left side.

As described above, provided is a construction machine including an exhaust-gas after-treatment device and capable of supporting the exhaust-gas after-treatment device in a limited space. The construction machine includes: an upper frame; an engine mounted on the upper frame via a plurality of engine mounts; a hydraulic pump coupled to the engine; an exhaust-gas after-treatment device carried by the upper frame; and a support cradle supporting the exhaust-gas after-treatment device at a position over the hydraulic pump. The upper frame includes a plurality of mount support portions to which the plurality of engine mounts are fixed, respectively, and a leg support portion. The support cradle has a support stage on which the exhaust-gas after-treatment device is placed and a plurality of legs each extending downward from the support stage. The plurality of mount support portions include a space-defining mount support portion defining a horizontal space between the space-defining mount support portion and the hydraulic pump. The plurality of legs include an in-space leg having a foot as a bottom end thereof and disposed in the space. The leg support portion is located so as to overlap the space in a plan view to allow the in-space leg to extend vertically in the space while the foot of the in-space leg is fixed to the leg support portion.

This construction machine, where the leg support portion is located so as to overlap the space defined between the spacing mount support portion and the hydraulic pump in a plan view to allow the in-space leg included in the plurality of legs to extend in the space while the foot thereof is fixed to the leg support portion, allows the in-space leg to be disposed by utilization of the narrow space even if the construction machine is a small one having only a limited space, such as a tight quarter type of construction machine, thereby making it possible to support the exhaust-gas after-treatment device at the position over the hydraulic pump. Besides, the leg support portion, which is located so as to be visible through the space in the downward view from the top of the construction machine in a plan view, allows the foot of the in-space leg to be placed on the leg support portion by only an operation of lowering down the assembly of the exhaust-gas after-treatment device and the support cradle from a position just above the upper frame, by a crane or the like. This facilitates the mounting of the support cradle to the upper frame.

It is preferable that the construction machine further includes an intake tube connected to the hydraulic pump for sucking hydraulic fluid from a hydraulic fluid tank mounted on the upper frame, wherein the leg support portion supports the foot of the in-space leg at a lower position, in a side view, than a position where the intake tube is disposed. This disposition allows an operator to perform the operation of fixing the in-space leg to the leg support portion on one lateral side of the construction machine under the condition where the foot of the in-space leg is placed on the leg support portion. This facilitates the assembling operation in a mass-production line, or the mounting and dismounting operation in an operation site owing to the configuration.

It is preferable that the spacing mount support portion includes a pair of mount support plates spaced horizontally and a mount seat plate joined to the pair of mount support plates so as to the pair of mount support plates, one of the engine mounts being fixed to the mount seat plate, and that the leg support portion includes a leg support plate spaced horizontally from a pump-side mount support plate that is one of the pair of the mount support plates and is closer to the hydraulic pump than the other of the mount support plates, and a cradle seat plate joined to the pump-side mount support plate and the leg support plate so as to bridge the pump-side mount support plate and the leg support plate, the foot of the in-place leg being fixed to the cradle seat plate. The pump-side mount support plate, thus serving as both the constituent element of the spacing mount support portion and that of the leg support portion, enables the exhaust-gas after-treatment device supported by the support cradle fixed to the leg support portion to be positioned relatively to the engine supported by the pump-side mount support plate with high accuracy.

In this case, it is preferable that the plurality of legs include a counter leg having a foot and located on opposite side to the in-space leg across the hydraulic pump, and the plurality of mount support portions include a counter mount support portion located on opposite side to the space-defining mount support portion across the hydraulic pump, the foot of the counter leg being fixed to the counter mount support portion. Thus fixing the engine mount and the foot of the counter leg to the same another mount support portion enables the exhaust-gas after-treatment device to be positioned relatively to the engine with more enhanced accuracy.

This application is based on Japanese Patent application No. 2016-090507 filed in Japan Patent Office on Apr. 28, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine, comprising:
an upper frame;
an engine mounted on the upper frame via a plurality of engine mounts;
a hydraulic pump coupled to the engine;
an exhaust-gas after-treatment device carried by the upper frame;
a support cradle supporting the exhaust-gas after-treatment device at a position over the hydraulic pump; and
an intake tube connected to the hydraulic pump to allow the hydraulic pump to suck hydraulic fluid from a hydraulic fluid tank mounted on the upper frame through the intake tube, wherein:
the upper frame includes a plurality of mount support portions to which the plurality of engine mounts are fixed, respectively, and a leg support portion;
the support cradle includes a support stage on which the exhaust-gas after-treatment device is placed and a plurality of legs each extending downward from the support stage;
the plurality of mount support portions include a space-defining mount support portion defining a horizontal space between the space-defining mount support portion and the hydraulic pump;
the plurality of legs include an in-space leg having a foot as a bottom end thereof and disposed in the space, the leg support portion being located so as to overlap the space in a plan view to allow the in-space leg to extend vertically in the space while the foot of the in-space leg is fixed to the leg support portion; and
the leg support portion is located at a position deviated from the intake tube in the plan view to allow the in-space leg to extend vertically in the space and deviated downward from the intake tube in a side view to allow the foot of the in-space leg to be fixed to the leg support portion at a lower position than a position where the intake tube is disposed.

2. A construction machine according to claim 1, wherein: the spacing mount support portion includes a pair of mount support plates spaced horizontally and a mount seat plate joined to the pair of mount support plates so as to bridge the pair of mount support plates, one of the engine mounts being fixed to the mount seat plate; and the leg support portion includes a leg support plate spaced horizontally from a pump-side mount support plate that is one of the pair of the mount support plates and is located closer to the hydraulic pump than the other of the pair of the mount support plates, and a cradle seat plate joined to the pump-side mount support plate and the leg support plate so as to bridge the pump-side mount support plate and the leg support plate, the foot of the in-place leg being fixed to the cradle seat plate.

3. A construction machine according to claim 2, wherein: the plurality of legs include a counter leg having a foot as a bottom end thereof and located on opposite side to the in-space leg across the hydraulic pump; and the plurality of mount support portions include a counter mount support portion located on opposite side to the space-defining mount support portion across the hydraulic pump, the foot of the counter leg being fixed to the counter mount support portion.

* * * * *